Figure 1:
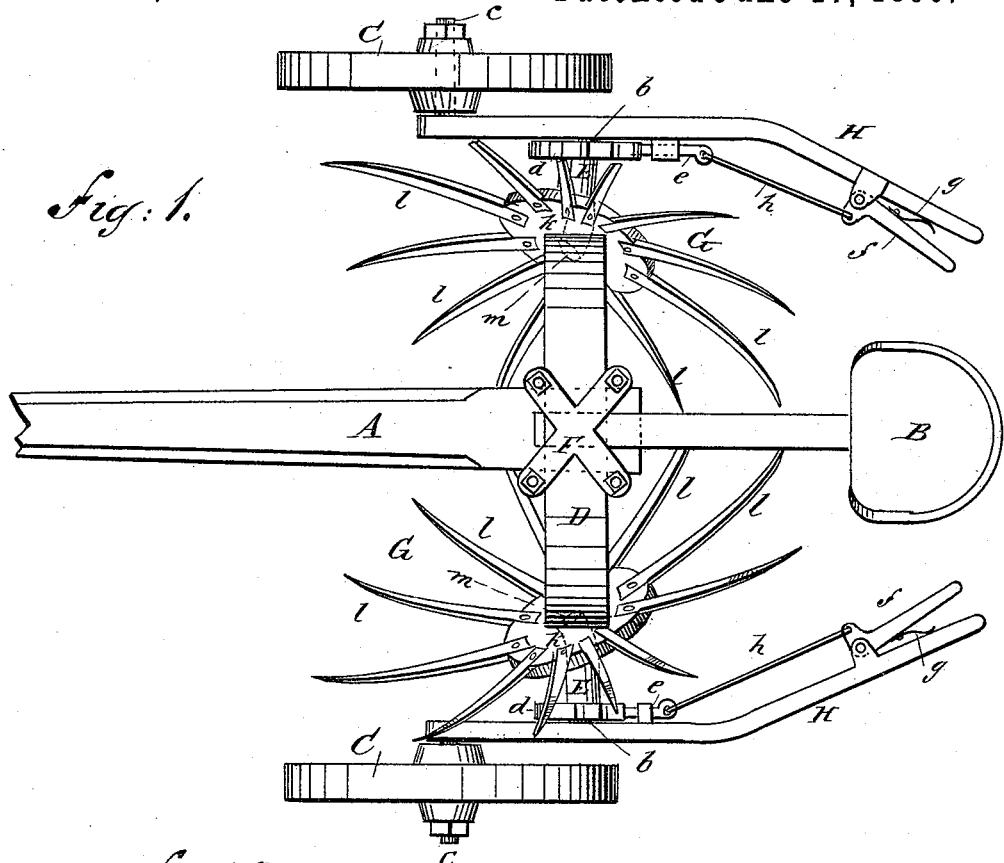

(No Model.)  2 Sheets—Sheet 1.

C. H. AYRES.
POTATO DIGGER.

No. 430,330.  Patented June 17, 1890.

WITNESSES:
Chas. Nigg
C. Sedgwick

INVENTOR:
C. H. Ayres
BY
Munn & Co.
ATTORNEYS (No Model.) 2 Sheets—Sheet 2.

C. H. AYRES.
POTATO DIGGER.

No. 430,330. Patented June 17, 1890.

WITNESSES:
Chas. Nidd
C. Sedgwick

INVENTOR:
C. H. Ayres
BY
Munn & Co.
ATTORNEYS.

UNITED STATES PATENT OFFICE.

CHARLES H. AYRES, OF HIGHTSTOWN, NEW JERSEY.

POTATO-DIGGER.

SPECIFICATION forming part of Letters Patent No. 430,330, dated June 17, 1890.

Application filed October 18, 1889. Serial No. 327,394. (No model.)

*To all whom it may concern:*

Be it known that I, CHARLES H. AYRES, of Hightstown, in the county of Mercer and State of New Jersey, have invented a new and useful Improvement in Potato-Diggers, of which the following is a full, clear, and exact description.

This invention relates to machines for digging potatoes, corn-stubs, and other vegetables or vegetable products, mainly such as are planted in rows, but it will be here more particularly described as used in digging potatoes; and it more especially has reference to that class of such machines in which rotary forks having radial tines and adapted to occupy oblique positions in upward directions away from each other and capable of being adjusted vertically are used.

The invention consists in a special combination of such rotary forks, whereby they are not only set to incline laterally in upward directions away from each other, but also in backward directions toward each other, so that when in operation they gradually dig into the row from opposite sides and approach or come together in the rear, thus causing them to act as diggers and lifters and cleaners of the potatoes, and making the whole machine complete as a plow without the aid of cultivator-teeth in advance to break up the ground ahead of the rotary forks.

The invention also consists in the combination, with such rotary forks and the frame used for carrying them, of levers for raising or lowering them, and carrying or running wheels having their axles or pivots on said levers, substantially as hereinafter described, and more particularly pointed out in the claims.

Reference is to be had to the accompanying drawings, forming a part of this specification, in which similar letters of reference indicate corresponding parts in all the figures.

Figure 2:
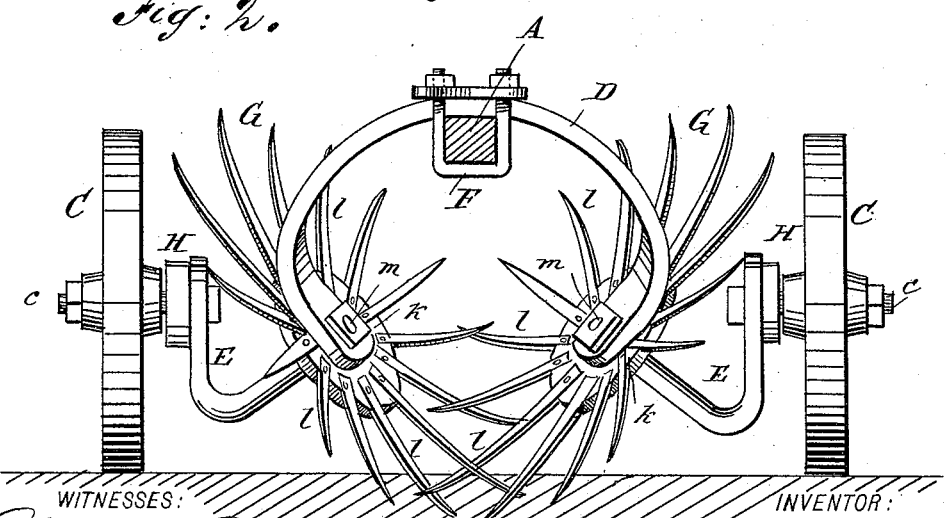
Figure 3:
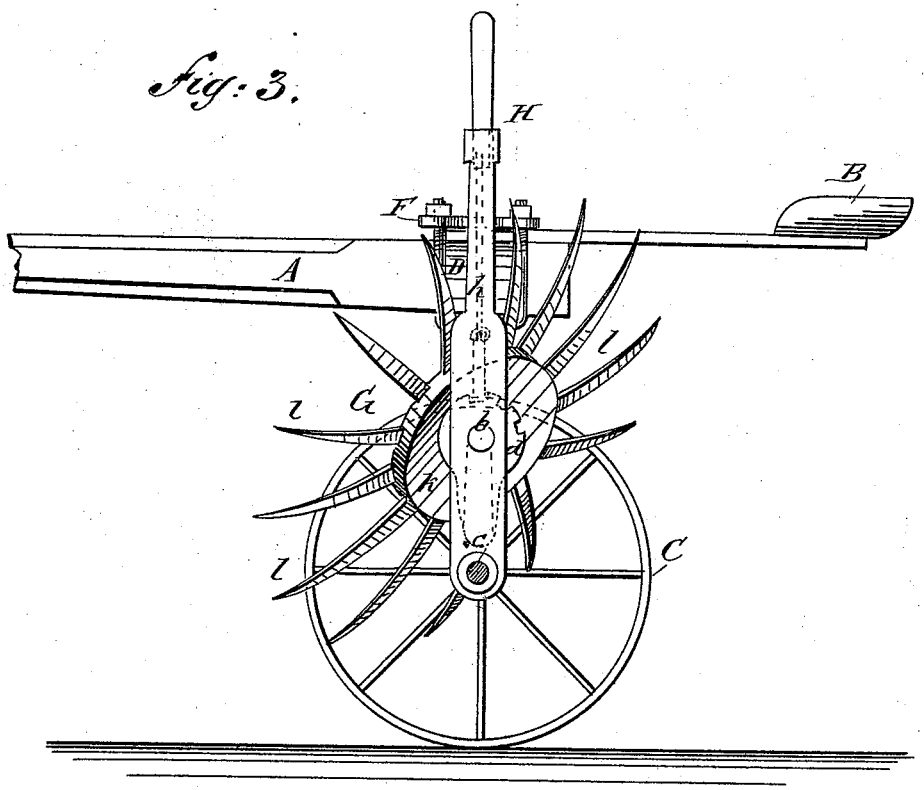

Figure 1 represents a plan view of a potato or like digging machine embodying my invention. Fig. 2 is a front end view of the same with the beam or draft-bar in transverse section. Fig. 3 is a side elevation of the machine; and Fig. 4, a partially sectional end elevation of one half or portion of the machine in part, mainly in illustration of the main frame, its raising and lowering lever, and the means used for carrying either rotary fork.

A indicates the beam or draft-bar of the machine; B, the driver's or operator's seat, connected with said beam by an extension in the rear, and C C the running or carrying wheels of the machine.

D E E indicate the frame of the machine, the one portion D of which is a saddle-like structure secured by a clip F to the beam A and united at its lower ends with the parts E E, which are in the form of cranked arms, the inner ends of which form the pivots or axles $m$ $m$ for the rotary forks G G to turn upon, while their outer upturned ends have pivoted to them, as at $b$ $b$, the levers H H, by which the main frame is raised or lowered to adjust the rotary forks G G up or down for the purpose of regulating the depth of entry of the forks by their tines into the ground, and for lifting them wholly out of the ground, as shown in Fig. 3, when not digging or when turning the machine. The forward ends of these levers carry the pivots or axles $c$ $c$, upon which the running or carrying wheels C C turn, and which form the fulcrums of said levers.

Any suitable ratchet device may be used to hold the levers H H when adjusted up or down—as, for instance, a notched circular projection $d$ on the outer ends of either arm E, with which a catch $e$, carried by each lever H, is arranged to engage, and from which it may be disengaged by pressing upon a cranked lever $f$, pivoted to each lever H, subject to control by a spring $g$, and connected by a rod $h$ with the catch $e$; but these special ratchet-adjusting devices form no part of my invention, as their counterparts are to be found in other digging or plowing machines, and they may be variously modified, as also the construction of the frame of the machine generally, with this exception, that the pivots or axles $m$ $m$, upon which the rotary forks G G turn, while arranged opposite each other upon reverse sides of the beam A, will in every case not only be set to incline upwardly in an inward direction toward the beam, but also to incline or converge toward one another in a forward direction relatively to the center line of draft, in order that the rotary forks G G will not simply be made to incline laterally in upward directions away from each other, but also in backward directions toward each other, which double obliquity of the rotary forks is important.

The oppositely-arranged rotary forks G G are each constructed with a center piece or hub $k$, from which the radial tines $l$, that are of slightly hooked or curved form facially in direction of their length, project, and said tines are preferably of such a length that when the rotary forks are adjusted to occupy their lowermost position for work the tines of both forks will mesh with one another below, as shown in Fig. 2, so as to make them act in unison and work without fail under the potatoes and form a sure lift for the latter as said forks are rotated by the resistance which the ground they enter presents while the machine is being drawn forward; but all independent gearing for operating them in unison is dispensed with.

Figure 4:
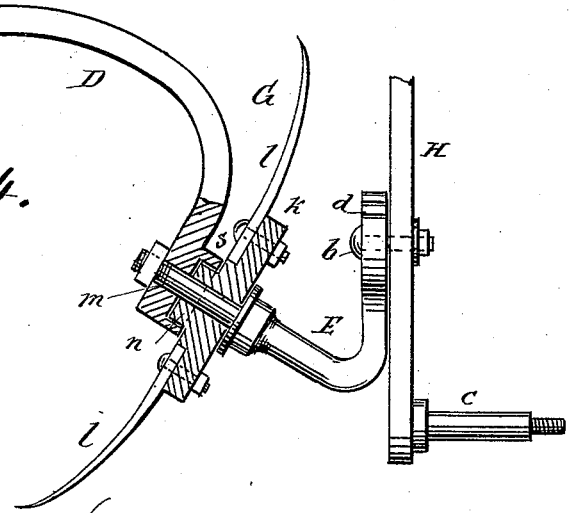

To exclude dirt from entering the bearings of the rotary forks, the inner faces of their hubs $k$ have a circular projection $n$, which is arranged to rotate within a cup-shaped projection or shield $s$ on the frame of the machine, as shown in Fig. 4.

By the double obliquity of the independently and loosely mounted rotary forks G G upon their pivots or axles $m\ m$, as hereinbefore described, said forks, when in position for operation in the earth, have their respective tines wider apart in front than in the rear of the two forks, as clearly shown in Fig. 1, whereby the tines of the two forks work more gradually into the earth from opposite sides of the row of potatoes being dug than if said forks only inclined laterally—that is, relatively to opposite sides of the machine—and the tines of the two forks come together in the rear. Said rotary forks will, too, thus be made not only diggers, but efficient lifters and cleaners of the potatoes.

Having thus described my invention, what I claim as new, and desire to secure by Letters Patent, is—

1. In a machine for digging potatoes and for other like purposes in which rotary forks having radial tines are used, the rotary forks arranged opposite each other on reverse sides of the line of draft, and having a double obliquity—that is, laterally in upward directions away from each other and in backward directions toward each other—the said forks being arranged in such proximity to each other that their tines will mesh with one another below, substantially as specified.

2. In a potato-digging machine, the rotary forks G G, arranged opposite each other on reverse sides of the line of draft, and having radial and curved tines $l$, meshing with each other below, in combination with a rising and lowering frame adapted to carry said forks, and provided with axles or pivots $m$ for said forks to independently rotate upon, set inclining upwardly in an inward direction toward the center line of draft and converging toward each other in a forward direction, essentially as described.

3. The combination, with the beam A and main frame carried by said beam and provided with axles or pivots $m\ m$, of the rotary forks G G, having radial tines $l$ and arranged to rotate upon said pivots in planes inclining both laterally in upward directions away from each other and in backward directions toward each other, the levers H H, connected with the main frame, for raising and lowering said rotary forks, and provided with forward end pivots or axles $c\ c$, and the running or carrying wheels C C, carried by said pivots or axles $c\ c$, substantially as shown and described.

CHARLES H. AYRES.

Witnesses:
BENJAMIN H. REED,
JOSEPH CHRISTIFF.